(12) United States Patent
Garner

(10) Patent No.: US 6,601,788 B2
(45) Date of Patent: Aug. 5, 2003

(54) METHOD AND APPARATUS FOR CREATING RUBBER CRUMB FROM VEHICLE TIRES

(76) Inventor: Larry Garner, 105 Maple, 3rd Floor, Rossville, GA (US) 30742

( * ) Notice: Subject to any disclaimer, the term of this patent is extended or adjusted under 35 U.S.C. 154(b) by 0 days.

(21) Appl. No.: 09/885,330

(22) Filed: Jun. 21, 2001

(65) Prior Publication Data

US 2002/0096583 A1 Jul. 25, 2002

Related U.S. Application Data

(60) Provisional application No. 60/263,682, filed on Jan. 23, 2000.

(51) Int. Cl.[7] .............................................. B02C 19/20
(52) U.S. Cl. ................. 241/24.17; 241/92; 241/DIG. 31
(58) Field of Search ................ 241/24.17, 27, 241/92, 278.1, DIG. 31, 15

(56) References Cited

U.S. PATENT DOCUMENTS

| | | | |
|---|---|---|---|
| 3,913,850 A | * 10/1975 | Daniel | 241/101.74 |
| 4,964,447 A | * 10/1990 | Farrell et al. | 144/162.1 |
| 5,115,983 A | 5/1992 | Rutherford, Sr. | |
| 5,316,224 A | 5/1994 | Dobozy | |
| 5,341,996 A | 8/1994 | Rutherford, Sr. | |
| 5,362,759 A | 11/1994 | Hunt et al. | |
| 5,385,307 A | * 1/1995 | Azar | 241/41 |
| 5,482,215 A | 1/1996 | Veres | |
| 5,675,882 A | 10/1997 | Hunt et al. | |
| 5,676,320 A | 10/1997 | Merklinger | |
| 5,683,038 A | 11/1997 | Shinal | |
| 5,794,861 A | 8/1998 | Rutherford, Sr. | |
| 6,015,105 A | 1/2000 | Brewer | |

* cited by examiner

Primary Examiner—John M. Husar
(74) Attorney, Agent, or Firm—Miller & Martin LLP

(57) ABSTRACT

An apparatus and method are described for creating rubber crumb from rubber vehicle tires. The method provides for the soaking of a vehicle tire in a solvent, removal of the tire from the solvent, movement of the tire by a conveyor to an apparatus that applies physical pressure to the tire, while situated upon a circular screen which allows the physical pressure applied to fragment the tire into its component parts, pressing the rubber components through the screen with any remaining liquid and allowing the non rubber components to be removed for recycling purposes or to be discarded. The apparatus applies physical pressure to separate the rubber and non rubber components from one another.

11 Claims, 4 Drawing Sheets

METHOD AND APPARATUS FOR CREATING RUBBER CRUMB FROM VEHICLE TIRES

CROSS REFERENCE TO RELATED APPLICATION

Benefit of the filing date of co pending provisional application No 60/263682 filed on Jan. 23, 2000 is claimed.

BACKGROUND OF THE INVENTION

This invention relates generally to the field of recycling rubber containing materials, and more particularly to an apparatus for processing rubber vehicle tires, effecting a separation of the various constituent materials comprising such tires, facilitating reclamation and recycling of said materials and obtaining usable crumb rubber.

Various studies show that approximately seventy-eight percent of used vehicle tires still end up in landfills or are illegally dumped. Vehicle tires held in stockpiles have trapped water through exposure to the elements, which provides an ideal habitat for disease carrying mosquitoes and rodents; and vehicle tires buried whole in landfills have fueled tire fires.

Portions of recycled tires, especially the rubber portion, when separated into crumb rubber, can be used as a fuel source, a component of asphalt paving mixtures and as extenders in a variety of thermoplastic or elastomeric products such as roofing materials, walk pads, carpet and flooring underlay, sport surfaces, and other products. Vehicle tires typically consist of reinforcing metallic layers, fabric layers, and rubber containing materials. To obtain usable crumb rubber for the above referenced uses, the metallic layers must be separated from the rubber containing materials.

Many of the methods currently used to recycle vehicle tires require precutting, followed with grinding of the tires. These methods use large amounts of power, create wastewater streams, cause wear and tear on the grinding apparatus, and do not completely separate the metallic layers from the rubber components. Information relevant to attempts to address these problems can be found in U.S. Pat. Nos. 5,683,038; 5,482,215; and 5,675,882. However, each one of these references suffers from one or more of the following disadvantages: use of large amounts of power, whether to power the machinery or to provide pressure to water jets, and use of one or more cutting type apparatus. Additionally, U.S. Pat. No. 5,611,492 requires precutting of the tires and the use of energy to power both microwave and vacuum to complete recovery of the rubber crumb.

As the market for crumb rubber grows exponentially, new, better and more economical methods for obtaining crumb rubber without creating additional burdens on the environment are necessary, which the instant invention provides.

SUMMARY OF THE INVENTION

A primary object of the present invention is to reduce the time, energy, and effort spent in recycling vehicle tires. Another object of the present invention is to recycle scrap tires to produce a separation of the rubber material from the metallic constituents of said tires. Another object of the present invention is to ease the burdens scrap tires place on the environment by use of environmentally friendly solvents and lessen the amount of energy used in the recycling process.

These objects and others are achieved in the present invention which provides a method and an apparatus for processing scrap rubber vehicle tires and, by means of soaking said tire in an environmentally friendly solvent to soften the tire, making the tire more malleable, applying direct pressure to the tire to force the tire against a rotatable grater surface which separates the components of the tire, allowing the shredded rubber components to pass through the grater surface for further work, leaving behind the fabric and metallic constituents which are moved from the grater surface off the crescent shaped table and discarded or subjected to further processing.

DESCRIPTION OF DRAWINGS

These and other features, aspects, and advantages of the present invention will become better understood with regard to the following description, appended claims and accompanying drawings.

DESCRIPTION OF A PREFERRED EMBODIMENT

The inventive method and apparatus 8 described herein does not necessitate precutting or shredding of the rubber vehicle tire but precut tires can be used in addition to whole tires. The rubber vehicle tire or chips do require softening before further processing can be accomplished. Many solvents are suitable softening agents, such as petrochemical solvents or chlorinated solvents; however, given environmental concerns with the use of chlorinated hydrocarbon solvents, the solvent used in the inventive method and apparatus is one or more solvents selected from the group of essential oils. The softening process is not generally sensitive to temperature and may be carried out at room temperature or any other temperature between the freezing point and the boiling point of the solvent or solvent mixture. The actual temperature will be determined by convenience. Rubber tires show substantial softening after approximately three hours of soaking in the solvent. The rubber tires may be immersed in a tank 10 containing the solvent or mixture of solvents. The tank 10 may be provided with an agitator, such as air nozzles and/or heating elements to heat the solvent. Alternatively, the rubber vehicle tire can be contacted with the liquid or mixture of liquids through sprayers located within the tank 10 or bin, or by sealing the tank 10 or bin and placing the rubber tires therein with the solvent in a gaseous state. The solvent would be further processed, typically through settling tanks or other means, and reused in the present apparatus. However, such equipment for processing of the effluent fluid stream for recovery of tire fragments, other debris and reusable fluid are not part of the present apparatus.

Figure 1:
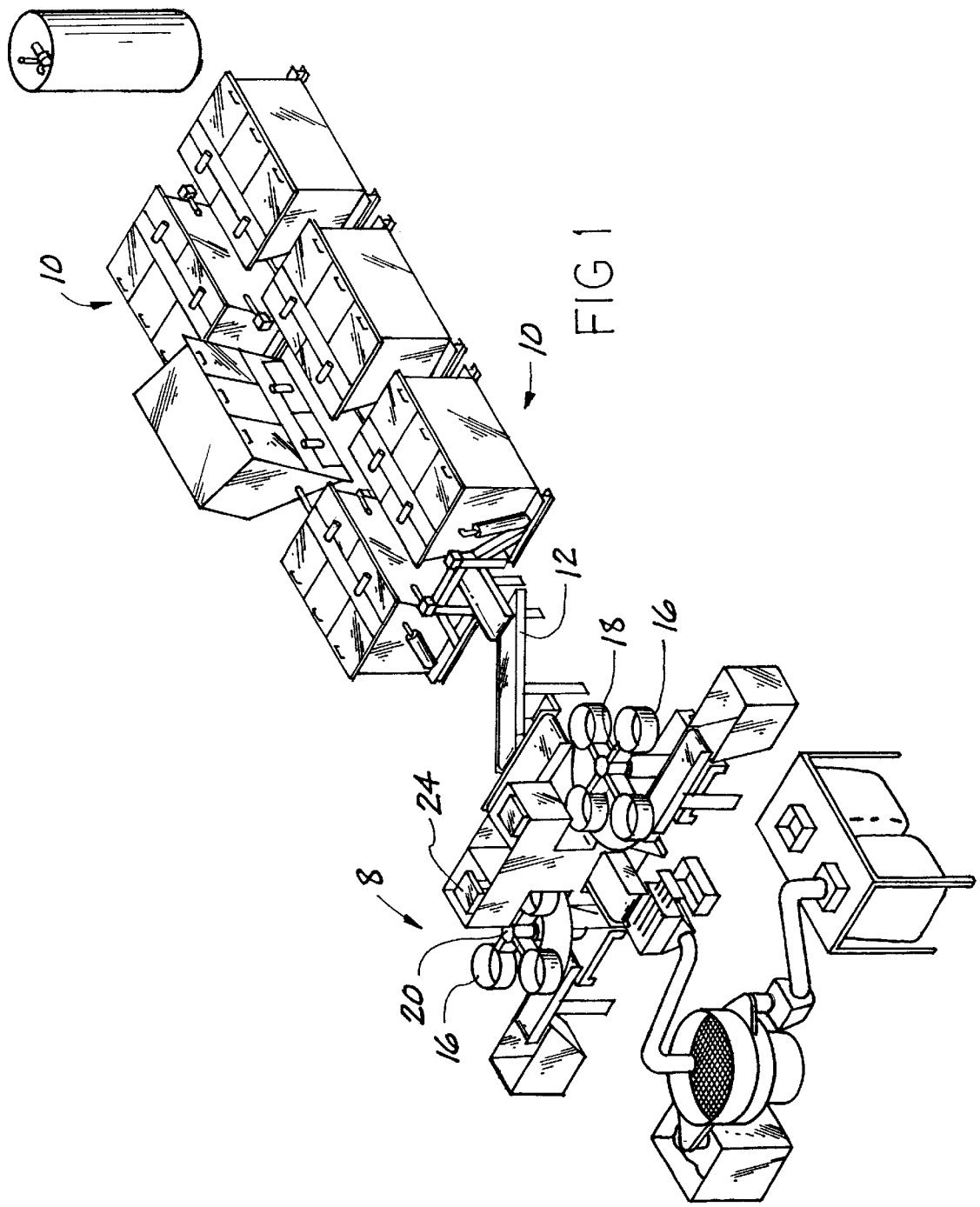
FIG. 1 is a top and left side perspective view of the apparatus for the inventive process.
Figure 2:
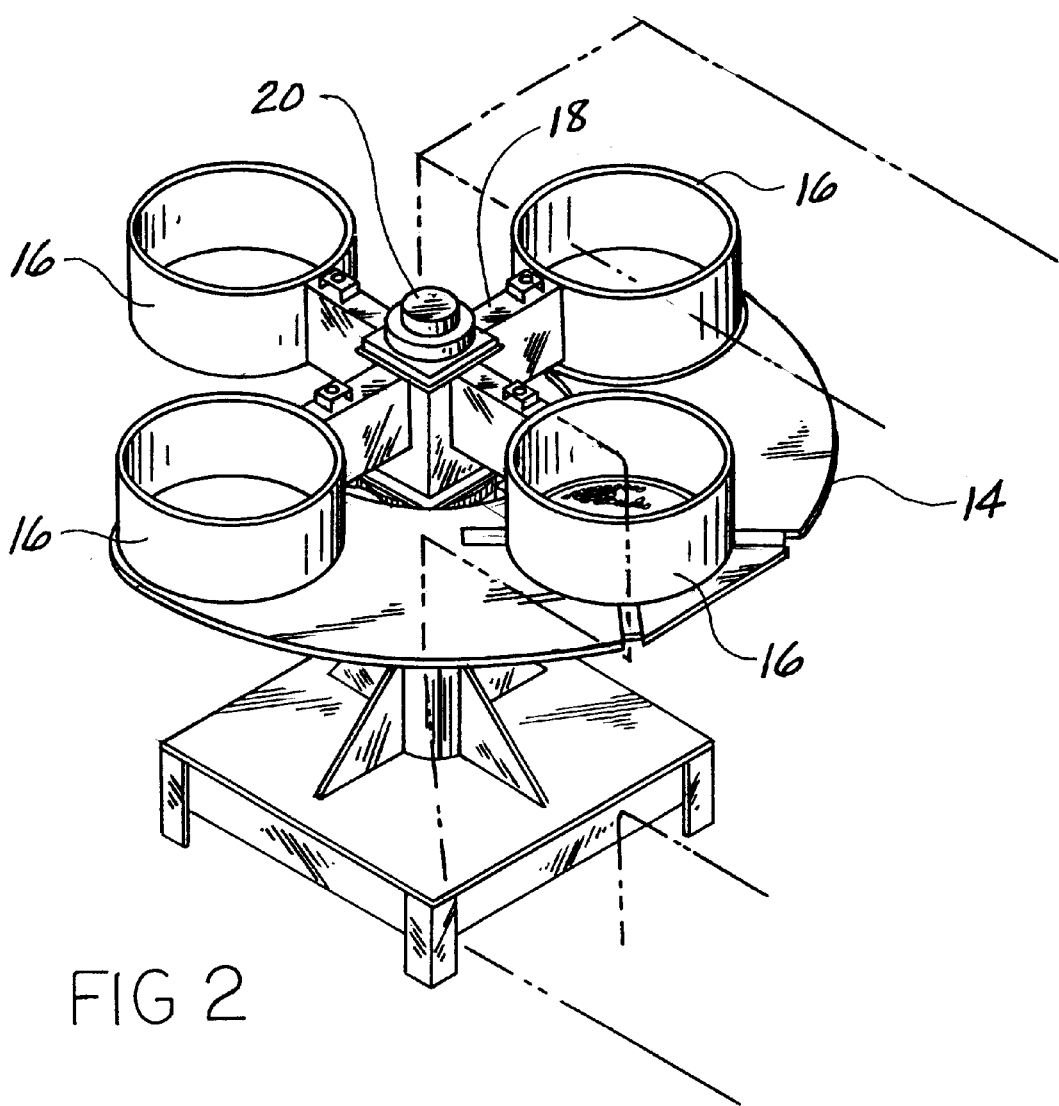
FIG. 2 is a perspective view of the crescent shaped table of the apparatus shown in FIG. 1.
Figure 3:
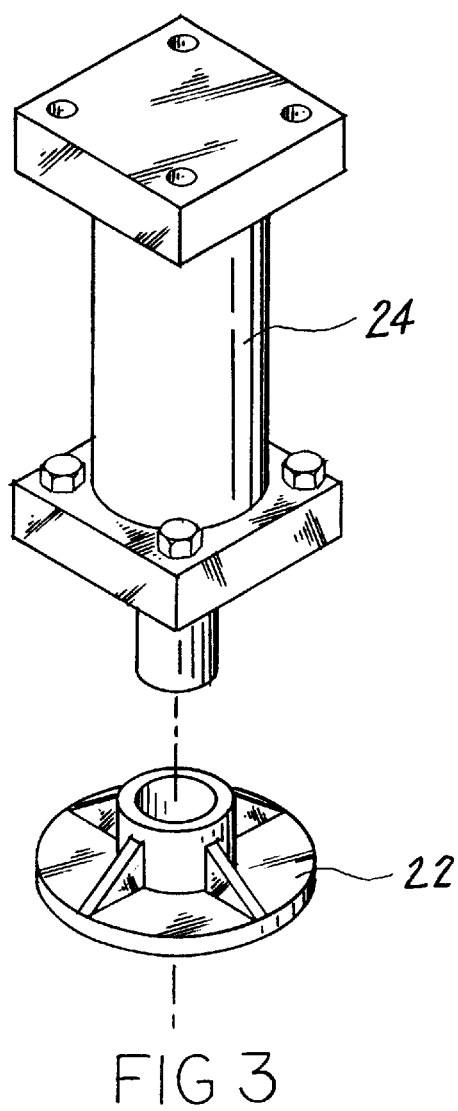
FIG. 3 is an exploded view of the hydraulic press and upper circular platen.

Referring to FIG. 1, a preferred embodiment of the apparatus 8 is shown in which a soaking tank 10 or tanks are sufficiently filled with a solvent to cover the surface area of the tires contained in the tank 10. The rubber tires are kept in contact with the solvent in the tank 10 for approximately three hours at room temperature until the rubber of the tires is considerably softened. Soaking tanks 10 are equipped with means to allow said tanks to drain the solvent away from the tires for recycling and further use. Additionally, still referring to FIG. 1, soaking tanks 10 are equipped with means to allow said tanks to dump the softened tire onto a conveyor belt system 12. Conveyor belt system 12 moves the tire from the vicinity of the soaking tanks 10 to a crescent shaped table 14. Referring to FIG. 2, one or more tires are placed one tire within one of four circular rings 16 for movement across the crescent shaped table 14. Referring to FIG. 5, the circular rings 16 are mounted on arm 18 and rotate horizontally about pivot 20 to position the tire beneath the upper pressing plate 22 where pressure is applied to the tire held in circular ring 16 by the hydraulic piston 24. Still referring to FIG. 5, circular ring 16 serves to hold the tire in position on the lower grating plate 26, centered in crescent shaped table 14. As noted in FIG. 4, the lower grating plate 26, which possesses apertures therethrough for optimum grating, is movably mounted directly above chute 28 and within a toothed gear 32 and belt drive assembly 30, allowing for rotating movement to be applied to the lower grating plate 26. Once the tire is in position, pressure is applied to the tire by upper pressing plate 22 by a hydraulic piston 24 (FIG. 3). Hydraulic piston 24 is moved in a vertical direction by hydraulic pressure provided by an electrical supply. Hydraulic pressure moving hydraulic piston 24 provides smooth high-pressure vertical motion of the upper pressing plate 22 against the tire. Equivalent means can be used to give smooth vertical displacement of the upper pressing plate 22, including ball screws or acme screws, within the contemplation of the present invention.

Figure 4:
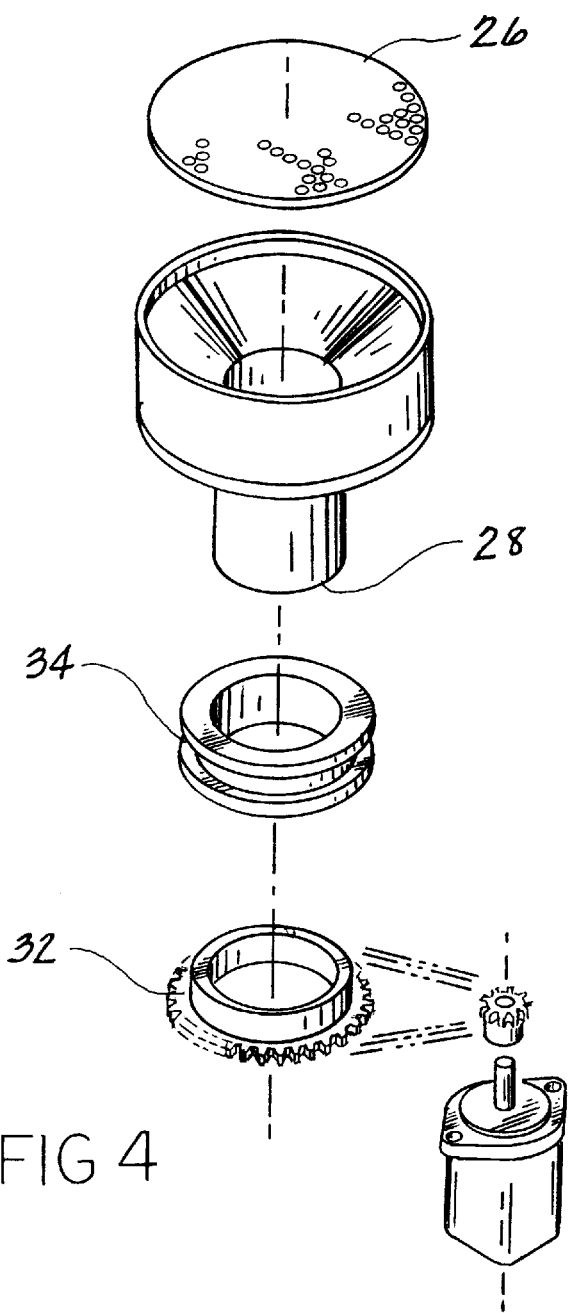
FIG. 4 is an exploded view of the rotatable grater surface of the crescent shaped table of FIG. 2.
Figure 5:
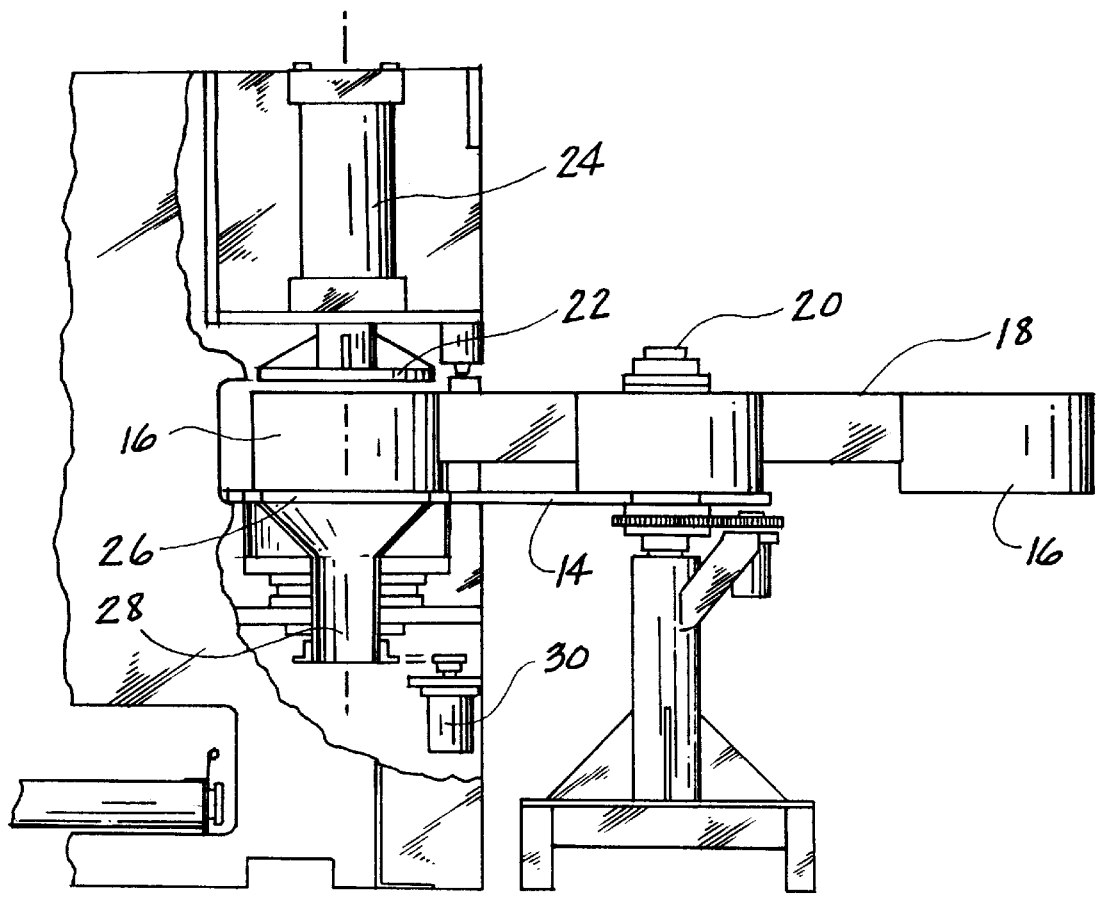
FIG. 5 is a side elevational fragmentary view of the crescent shaped table and hydraulic press having the press housing partially removed.

With further reference to FIG. 4, the apertures in the lower grating plate 26, the circular movement of said lower grating plate coupled with the downward pressure applied by the upper pressing plate 22 serve to fragment the tire into various mesh sizes of rubber components. The apertures in the lower grating plate 26 placed above chute 28 allow the fragmented rubber components and any extraneous fluid to exit therefrom, while retaining on the crescent shaped table 14, the fabric and metallic constituents. Since the metallic constituents of a typical tire are either constructed in a large mat as the cord, while the bead is typically a large circle of steel surrounding the inner circumference of the tire, any reasonable size aperture will suffice to retain these fabric and metallic components on top of the crescent shaped table 14 for movement away from the lower grating plate 22 so that such components may be further recycled or discarded. Referring again to FIG. 1, movement of arm 17 about pivot 17a provides movement of the circular ring 16 with the fabric and metallic constituents remaining therein so that the circular ring 16 makes a complete circuit of the table 14 and discard the fabric and metallic constituents while moving a new tire into place to be shredded.

Referring again to FIG. 4, the exact size and shape of such apertures 28 can be adjusted to differ the size of the fragments of tire made through the shredding process. Apertures 28 can be varied having a size of 0.5 inches to about 3 inches. Apertures 28 having such a range have been employed in the present invention with excellent results, although very differently sized apertures could easily be used without affecting the essential nature of the present invention. At least seven different mesh sizes have been collected from the use of one aperture size. Referring again to FIG. 1, the rubber components of the tire exit from the apparatus 8 by passing through the lower grating plate 26 and the chute 28, for subsequent processing. Air drying and screening are envisioned as means to separate the rubber fragments from any remaining fluid and render it suitable for recycling and reuse. The dried rubber fragments are separated by oscillation or can be further sized by additional grinding in a grinder (not shown) before being passed into dry storage bins.

The method of the present invention can be used for separating components of rubber tires and comprises the following steps which may be accomplished by hand or by any number of mechanical means. A rubber tire is presoaked in a solvent such as d-limonene. The solvent is then drained away from the surface area of the tire. Then pressure is applied to the rubber tire whereby the rubber tire is pressed through a grating apparatus, such grating apparatus fragments and separates the rubber tire into rubber components and non rubber components by size, removing the non rubber components therefrom, and oscillating the rubber components to further separate them by size. The solvent may be any solvent known to soften materials in which natural or synthetic rubber is a component. Many of the solvents known in the art are harmful to the environment and given that an object of this invention is to ease all burdens which might be placed on the environment by recycling rubber tires, use of essential oils is the preferred solvent for this method. D-limonene provides excellent softening results at room temperature. One having ordinary skill in the art could make numerous modifications, alterations, or substitutions to the present apparatus while remaining within the spirit and scope of the invention. However, we present the apparatus herein as the presently preferred embodiment of such a tire fragmentation apparatus and method.

What is claimed is:

1. An apparatus for creating rubber crumb from pre-softened rubber tires or chips comprising; a circular ring having an open top and an open bottom to allow insertion of the pre-softened rubber tire into said open ring top for capture of said tire therein, a circular plate mounted adjacent to said open ring bottom to support the tire thereon, said plate being rotatable and having a plurality of apertures therethrough, and means for applying compression to force the tire against said plate apertures for fragmentation of the tire into rubber crumb and non rubber components.

2. The apparatus of claim 1 where the means for applying compression further comprise: the use of electrical power which provides the pressure to transmit motion to an upper plate, moving the upper plate vertically in reference to the pre-softened rubber tire.

3. The apparatus as claimed in claim 1 wherein said rubber components are further separated by oscillating means to a uniform particle size.

4. An apparatus for creating rubber crumb from pre-softened rubber tires or chips comprising:
   a circular ring having an open top and an open bottom to allow insertion of the pre-softened rubber tire into said open ring top for capture of said tire therein,
   a plurality of arm members where each arm member at its distal end possesses a circular ring,
   a rotating axle member where one or more arm members are mounted,
   a stand upon which the rotating axle member is mounted,
   a circular plate mounted adjacent to said open ring bottom to support the tire thereon, said plate being rotatable and having a plurality of apertures therethrough, and
   means for applying compression to force the tire against said plate apertures for fragmentation of the tire into rubber crumb and non rubber components.

5. The apparatus as claimed in claim 2 further comprising means for moving the pre-softened rubber tire from pre-softening to the circular ring.

6. The apparatus of claim 5 wherein said moving means comprise a conveyor belt system.

7. A method for separating rubber components of tires comprised of rubber components, fabric components and metal components, the method comprising: soaking a tire having a rubber component in an environmentally friendly solvent to produce a softened tire, placing said softened tire on a rotatable grater surface, applying pressure to said softened tire to force said softened tire against said rotatable grater surface to shred said rubber components of said softened tire.

8. The method of claim 7, which further comprises the step of separating from the rubber components, metal components and fabric components.

9. The method of claim 7, which further comprises the steps of: moving the rubber components to an apparatus which oscillates; and oscillating the rubber components to separate the rubber components by size.

10. The method as claimed in claim 7 wherein said solvent is an essential oil.

11. The method as claimed in claim 10 wherein said essential oil is d-limonene.

* * * * *